United States Patent [19]

Cicci et al.

[11] 4,174,600

[45] Nov. 20, 1979

[54] ROLL OPENING DEVICE WITH HEADER STABILIZER

[75] Inventors: George B. Cicci, Burr Ridge; John D. Segredo, Chicago, both of Ill.

[73] Assignee: International Harvester Company, Chicago, Ill.

[21] Appl. No.: 914,319

[22] Filed: Jun. 12, 1978

[51] Int. Cl.² .............................................. A01D 45/02
[52] U.S. Cl. ............................................... 56/1; 56/14.4
[58] Field of Search ..................... 56/1, DIG. 1, 14.1, 56/14.2, 14.3, 14.4

[56] References Cited

U.S. PATENT DOCUMENTS

| | | | |
|---|---|---|---|
| 3,175,343 | 3/1965 | Johnston et al. | 56/1 |
| 3,397,520 | 8/1968 | Johnston et al. | 56/1 |
| 3,599,405 | 8/1971 | Hurlburt et al. | 56/14.4 |
| 3,672,135 | 6/1972 | Peacock et al. | 56/14.2 |

Primary Examiner—Russell R. Kinsey
Attorney, Agent, or Firm—Dennis K. Sullivan; Neal C. Johnson; F. David AuBuchon

[57] ABSTRACT

A roll opening device is provided for a hay harvesting machine of the type having a wheel supported main frame and a laterally elongated crop harvesting header mounted to the frame by pivotal linkage, the header having a fixed lower conditioning roll and an upper roll mounted on lever arms pivoted on said header and biased by tension spring to an operating position adjacent the lower roll. A toggle link is pivotally mounted to the header at each end of the roll adjacent the roll lever arms and is connected thereto. Tensile members interconnect the free ends of the toggle links with the frame so that when the header is raised to the transport position, the tensile members open the rolls against the force of the tensioning springs.

4 Claims, 7 Drawing Figures

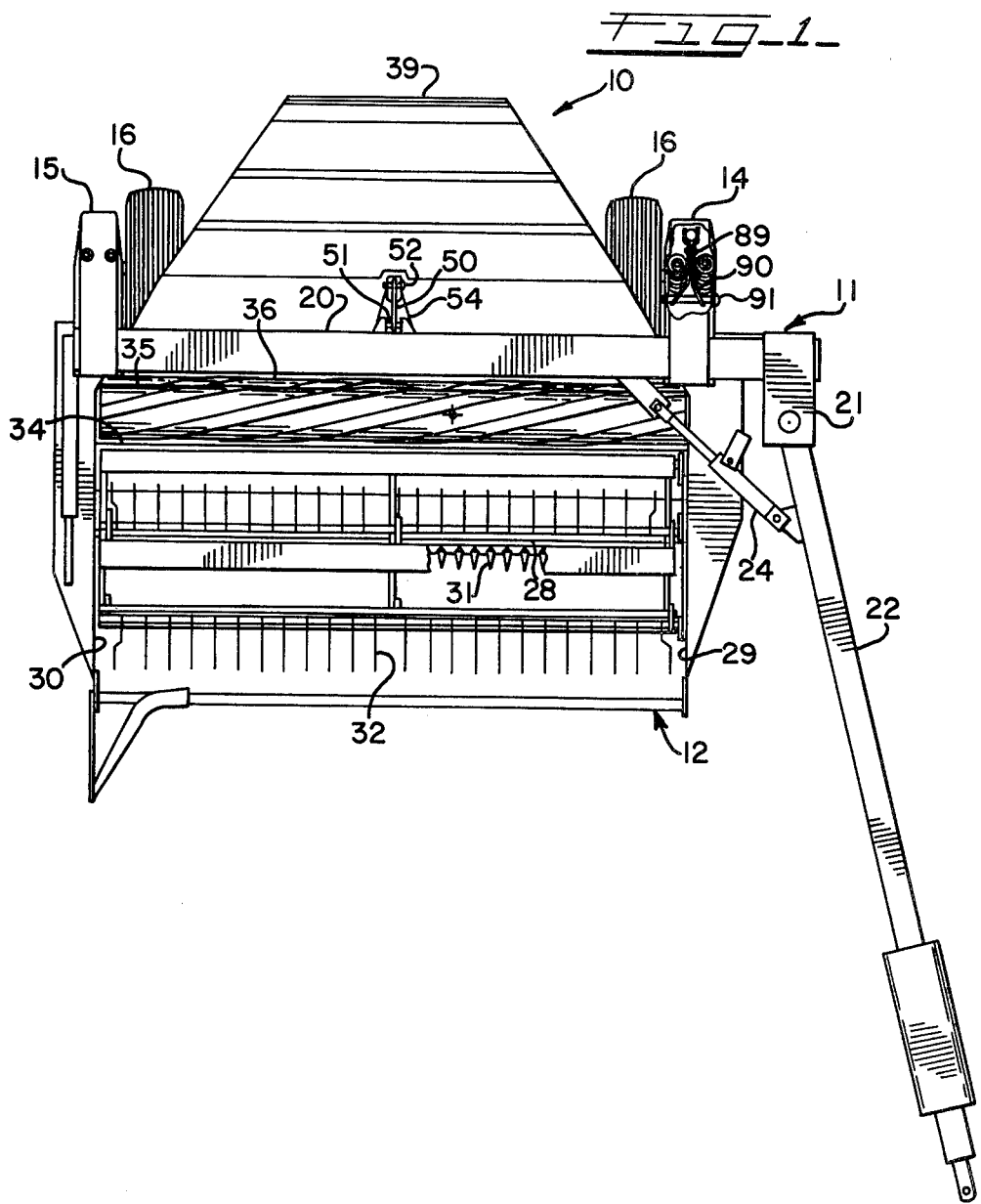

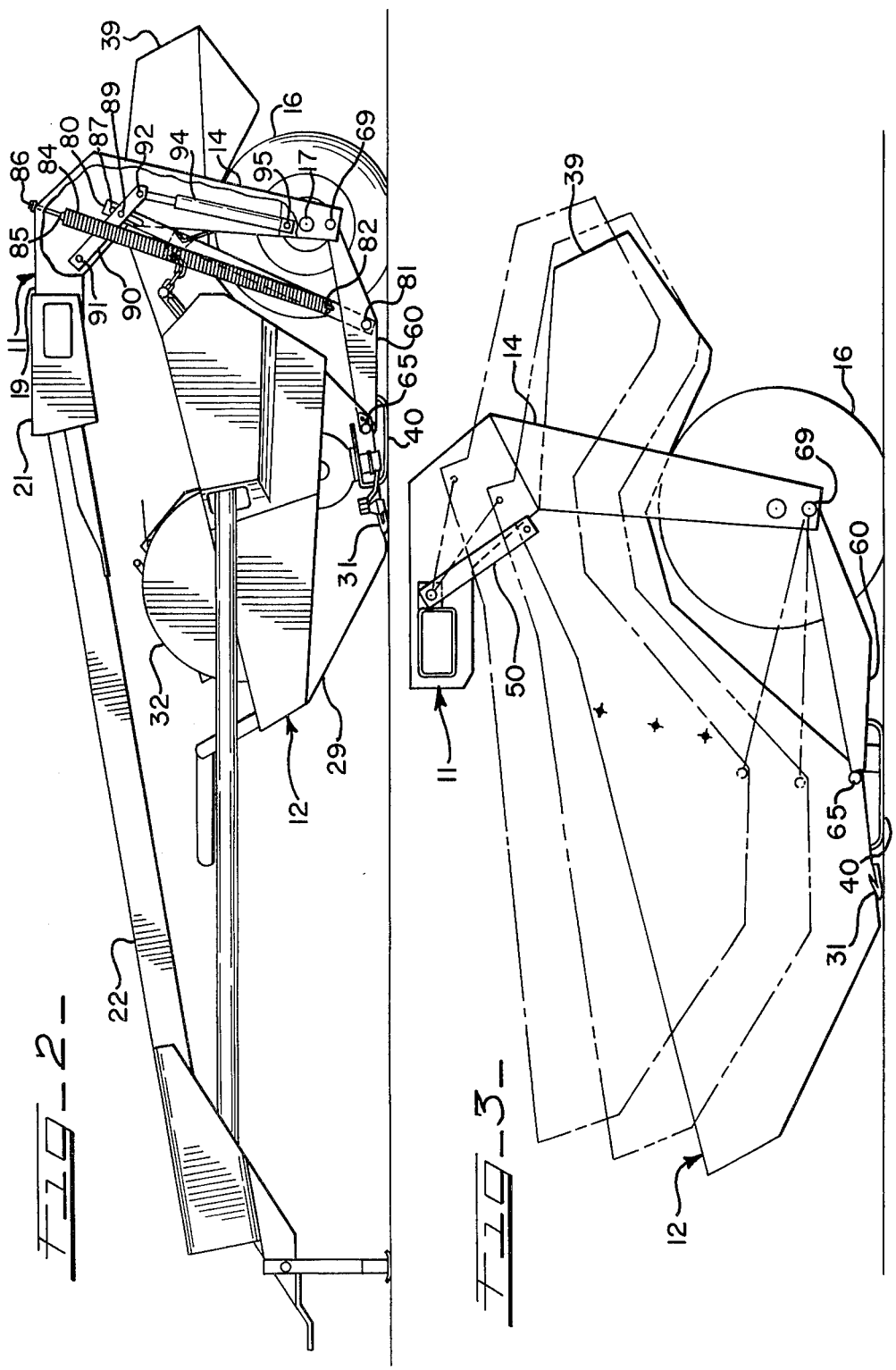

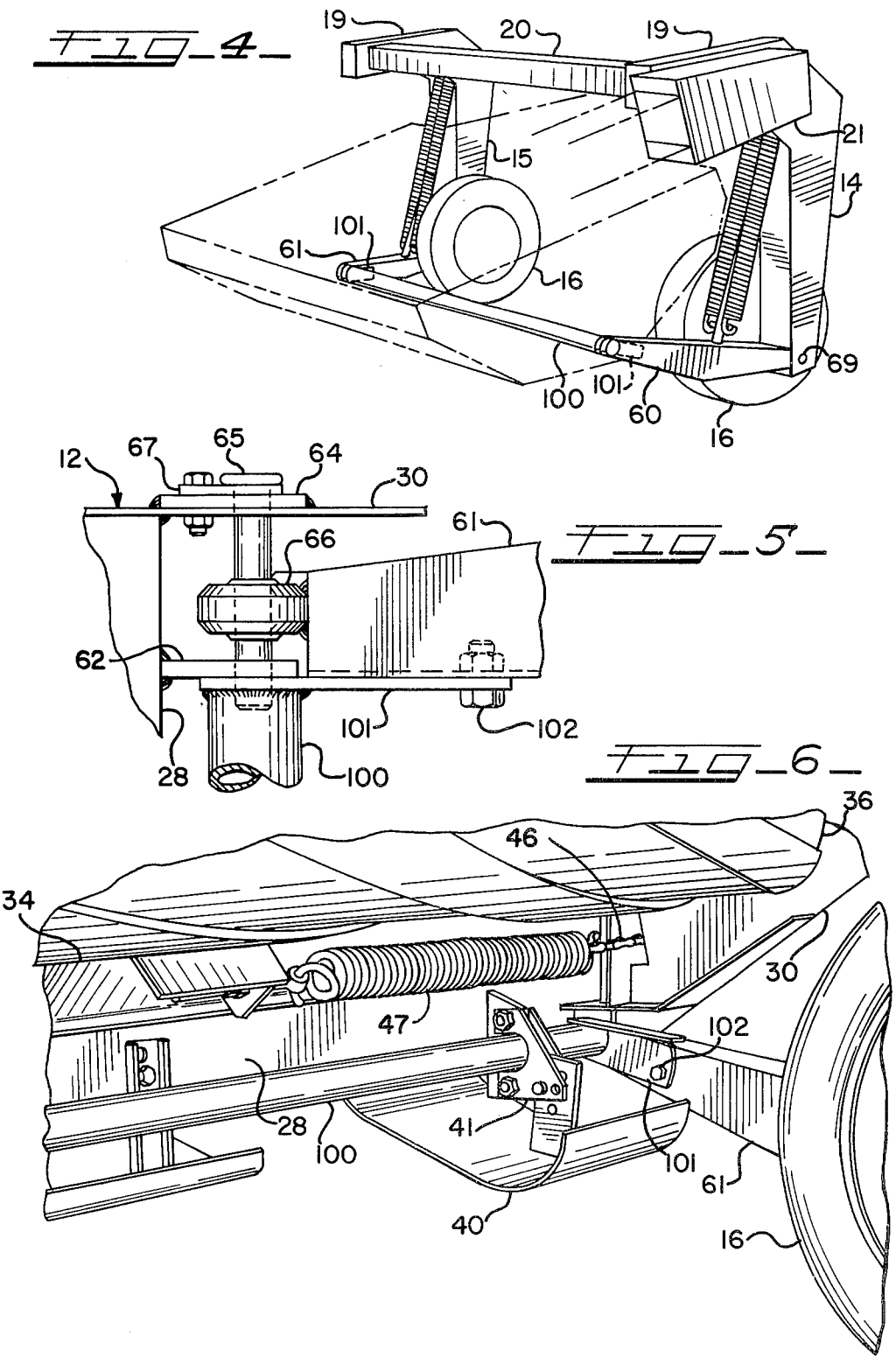

ROLL OPENING DEVICE WITH HEADER STABILIZER

BACKGROUND OF THE INVENTION AND THE PRIOR ART

This invention relates to hay harvesting and conditioning machines, such as mower-conditioners and wind-rowers, of the type having a mobile frame to which is mounted a laterally elongated header having hay cutting apparatus and a pair of laterally disposed crop conditioning rolls mounted thereon and, more particularly, to apparatus for automatically opening the conditioning rolls when the header is raised to the transport position.

Previous automatic conditioning roll opening devices for hay conditioners are disclosed in Johnston, et al. U.S. Pat. No. 3,397,520 and Peacock, et al. U.S. Pat. No. 3,672,135. In these devices, the conditioning rolls are automatically raised by a linkage when the header is raised. This system is effective for clearing the rolls when they become clogged with excess crop or other debris during operation. However, in the Johnston, et al. patent, the carrying wheels were pivoted on the header frame, and in the Peacock, et al. patent the header was pivotally mounted on the frame and thus the header had no lateral floatation. In the present invention, the crop harvesting header is mounted by a three point suspension from a wheeled carrying frame in a four bar linkage arrangement providing lateral floatation as well as advantageous movements of the header relative to the frame, as may be seen in copending application Ser. No. 914,321. However, the very flexibility of the mounting in the operating position can lead to difficulties in the transport position with the header bouncing vertically and swinging laterally relative to the frame, particularly when the floatation springs are not adjusted equally or in side hill operation.

SUMMARY OF THE INVENTION

Accordingly, it is an object of the invention described and claimed herein to provide a hay harvesting machine of the type having a crop harvesting header which is vertically movable relative to its carrying frame with a conditioning roll opening device which in addition to performing its roll opening function serves to stabilize the header in the transport position.

This and other objects of the invention are specifically met in a hay harvesting machine having a wheel supported main frame including a pair of laterally disposed vertical frame members rigidly interconnected by a laterally extending horizontal beam, a laterally elongated crop harvesting header mounted to the frame by a pivotal linkage including an upper link and a pair of laterally spaced lower swing links permitting movement of the header between operating and transport positions, a hay cutting apparatus mounted on the header and disposed transversely across the forward edge thereof, and upper and lower transversely extending conditioning rolls rotatably mounted to the header for receiving crops from the cutting apparatus, the lower conditioning roll being mounted on a fixed axis and the upper roll being mounted at each end on lever arms pivotally mounted on the header and biased by a tensioning apparatus to an operating position with the upper roll closely adjacent the lower roll. The roll opening structure comprises toggle links pivotally mounted to the header adjacent each of the roll lever arms and connected thereto and extending rearwardly toward the frame and a chain tensioning members attached to the free ends of the toggle links and to the frame and disposed to exert a downward force on the free ends of the toggle links when the header is raised to the transport position so that the upper conditioning roll is opened against the force of the tensioning springs. It can be seen that when the header is disposed in the transport position the force of the tensioning springs impose a large load between the toggle link and the header frame on both sides which prevents the header from moving vertically and the tension applied to the chains cause the header to become equally displaced between the legs of the frame and prevent lateral shifting.

DESCRIPTION OF THE DRAWINGS

Other objects and advantages of the invention will become apparent upon reading the detailed description of the invention and upon reference to the drawings, in which:

FIG. 1 is a plan view of a mower-conditioner incorporating the invention described and claimed herein;

FIG. 2 is a left side view of the mower-conditioner of FIG. 1;

FIG. 3 is a schematic left side view of the motion of the header of the mower-conditioner of FIG. 1 relative to the carrying frame;

FIG. 4 is a schematic illustration of the carrying frame and lower suspension linkage of the mower conditioner of FIG. 1, the header being illustrated in phantom lines;

FIG. 5 is a detailed plan view partly in section of the intersection of the torque transmitting bar of FIG. 4 with the right lower suspension link;

FIG. 6 is a pictorial view of the lower right rear portion of the mower conditioner of FIG. 1.

DETAILED DESCRIPTION OF THE PREFERRED EMBODIMENT

Figure 7:
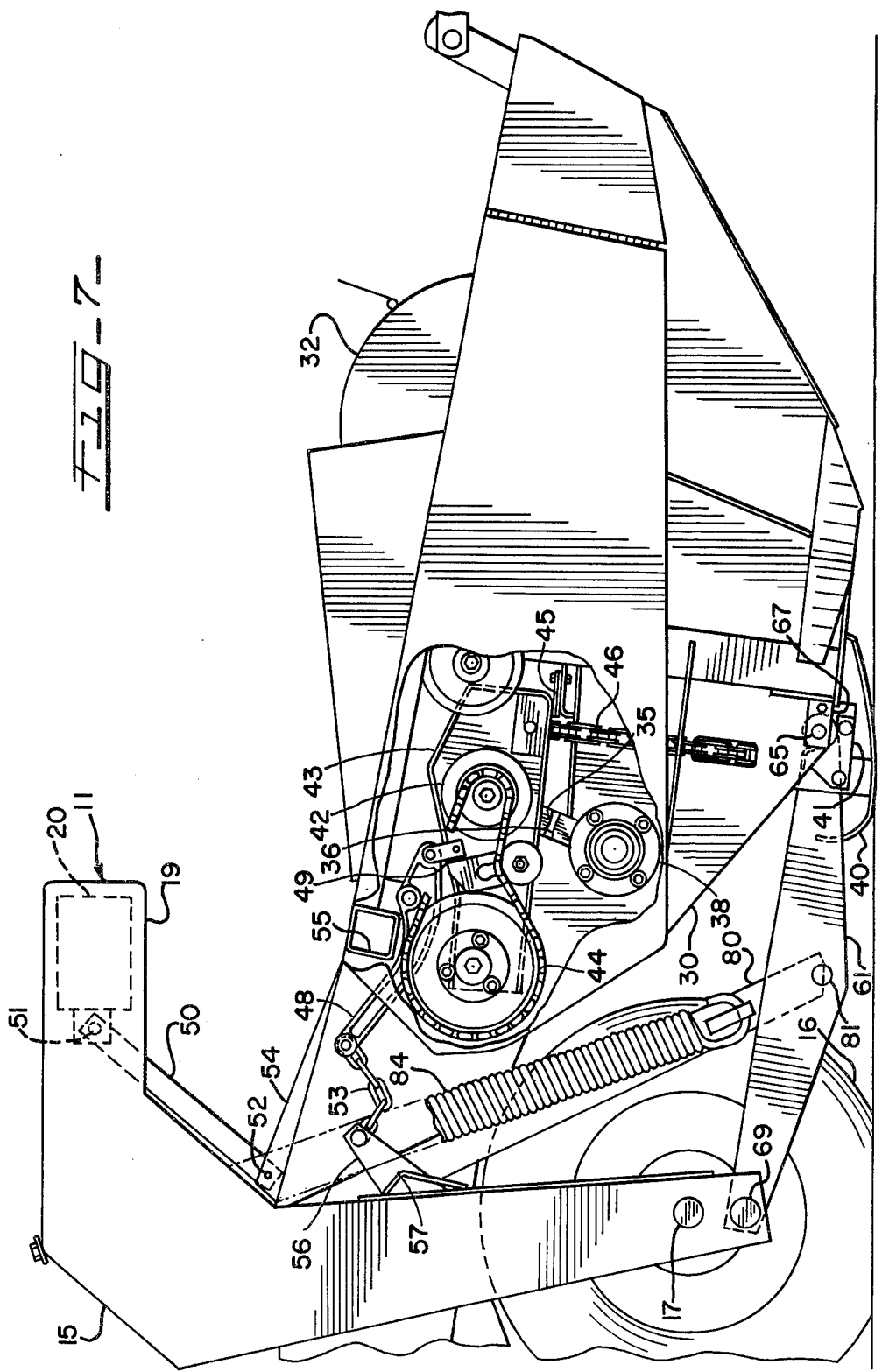
FIG. 7 is a right side view of the mower conditioner of FIG. 1 with a portion of the side cover removed to illustrate the conditioning roll mounting.

As used in the following description, the terms "left", "right", "forward", and "rearward", are to be taken as being viewed by a person standing at the rear of the harvester looking forward and should not be construed to limit the invention except as specifically noted.

Turning to the drawings, there is shown a mower-conditioner designated 10 which generally comprises a mobile carrying frame assembly 11 and a laterally elongated crop harvesting header assembly 12 mounted thereto by a linkage permitting the header 12 to move generally vertically relative to the frame assembly 11. The mobile carrying frame assembly 11 comprises left and right vertical frame members 14 and 15 having ground wheels 16 rotatably mounted on spindles 17 welded on the respective inner sides thereof adjacent the bottom. The vertical frame members 14 and 15 are of inverted L-shape and extend upwardly slightly to the rear to a forwardly extending upper leg portion 19 and are hollow to receive a portion of the lifting and floatation mechanism. As best seen in FIGS. 1 and 4, a horizontal main beam 20 is welded to and extends laterally between the forwardly extending upper leg portions 19 of the vertical frame members 14 and 15, thus forming an integral carrying frame structure. The horizontal main beam 20 extends laterally of the left vertical member 14 to a forwardly extending socket-like member 21 welded thereto to which the rear end of a tractor hitch tongue 22 is pivotally attached for lateral swinging. The tongue position is controlled by a hitch lock mechanism 24 of selectively variable length interconnecting the horizontal main beam 20 and the tongue 22 to control the relative position of the mower conditioner 10 behind a pulling tractor (not shown) which additionally provides mechanical and hydraulic power for operating the various mechanisms of the mower conditioner 10 in any known manner.

The crop harvesting header 12 is a conventional header used in hay harvesting machines, for example of the general type illustrated in Bornzin, et al. U.S. Pat. No. 3,625,537, comprising a laterally elongated cutterbar 28 which forms a main lateral frame member interconnecting the side sheets 29 and 30 of the header 12 and has a sickle bar type cutting apparatus 31 disposed laterally across the forward edge thereof. A conventional rotary reel 32 is rotatably mounted between side sheets 29 and 30 above the cutting apparatus 31 for removing crops therefrom and sweeping them rearwardly and upwardly along a platform sheet 34 attached to the rear of the cutterbar 28 and curved upwardly to follow the reel periphery. The crops are delivered into the nip of a pair of conventional laterally elongated upper and lower crop conditioning rolls 35 and 36 rotatably mounted between the side sheets 29 and 30 of the header 12. The crops are ejected from the conditioning rolls 35 and 36 in a rearward and upwardly directed stream into a windrow forming hood 39 wherein the crops are laterally consolidated and deposited on the ground in a windrow. The header 12 is further provided with means for regulating the minimum height of the cutting apparatus 31 from the ground in the form of a pair of ground engaging gage shoes 40 disposed respectively adjacent the left and right ends of the cutter-bar 28, being mounted thereto in conventional fashion by having their forward portions hooked into the bottom side of the cutterbar 28 just rearwardly of the cutting apparatus and having their rearward portions adjustably secured to brackets 41 mounted on the rear of the cutterbar, as shown in FIG. 6.

Viewing the conditioning roll mounting in greater detail, as shown in FIG. 7, it will be seen that the right end of the lower conditioning roll 36 is mounted with its axis in fixed position by a bearing 38 to the header side sheet 30. The upper roll 35 is mounted in a bearing 42 which in turn is mounted on a lever arm 43. The lever arm 43 is pivotally mounted to the side sheet 30 behind and about the axis of the reel idler pulley 44. The lever arm 43 is biased downwardly against a stop 45 attached to the side sheet which prevents the rolls from actually engaging, by means of a chain 46 attached to the lever arm 43 and extending downwardly therefrom around an idler pulley and through the side sheet 30 to a connection with a tension spring 47 (FIG. 6) adjustably attached to the header beneath the lower roll 36. In accordance with the invention, a toggle link 48 is pivotally mounted intermediate its ends to the side sheet 30 above the roll lever arm 43. The end of the toggle link 48 adjacent the lever arm 43 is pivotally connected thereto by a short connecting link 49 pivoted to both the toggle link 48 and the lever arm 43. The free end of the toggle link projects rearwardly toward the vertical frame member 15 of the carrying frame 11. A tensile member in the form of a chain 53 is attached to the free end of the toggle link 48 and to a bracket 56 projecting forwardly from the middle portion of the vertical frame member 15, the bracket 56 being backed up by a angle iron brace 57, to help it absorb side loading. The mechanism attaching the left end of the conditioning rolls to the left side sheet 29 and the toggle link 48 thereat are substantially mirror images of the above.

Thus, when the header 12 is in the operating position shown in FIG. 7, the chain 53 is slack and the conditioning rolls 35 and 36 are biased closely adjacent each other by the tensioning chain 46 and spring 47 which act on the upper roll lever arm 43 and are unopposed except by crops passing between the rolls. However, when the header 12 is raised to the transport position nestled beneath the horizontal beam 20 such as shown schematically in FIG. 3, the chain 53 exerts downward pull on the free end of the toggle link 48 which, acting through the connecting link 49, pulls the lever arm 43 upward against the force of the tension springs 47. In the transport position, the springs 47 exert a substantial force and place the two chains 53 disposed respectively on each side of the header in sufficient tension to prevent the header 12 from bouncing upwardly and from swinging laterally relative to the frame.

The header 12 is mounted in underslung fashion beneath the horizontal main beam 20 of the carrying frame 11 by means of a linkage permitting a range of generally vertical movements of the header relative to the frame, such as shown in FIG. 3 and which will be specifically described hereinafter. As shown in FIGS. 1 and 7, the linkage comprises an upper link 50 pivotally attached to a pin 51 mounted by brackets to the rearward side of the horizontal main beam 20 centrally between the vertical frame members 14 and 15. The upper link 50 extends downwardly rearwardly to a pivotal mounting with a pin 52 mounted on a bracket 54 attached to the upper side of the header 12 at the lateral center of the windrow hood 39 immediately behind an upper transverse beam 55 which also interconnects the side sheets 29 and 30. The lower rearward portion of the header 12 is linked to the lower portion of the vertical legs 14 and 15 respectively of the carrying frame 11 by left and right lower swing links 60 and 61. FIG. 5 illustrates the mounting of the right lower swing link 61 to the header 12. The mounting of the left lower swing link 60 to the header 12 is a mirror image of this mounting. A bracket 62 is welded to and extends rearwardly from the rear of the cutterbar 28 parallel to the right side wall 30, the latter being thickened by the addition of a welded plate 64 to provide additional strength. A pin 65 is inserted through slightly larger apertures in the side wall 30, a bearing 66 attached to the forward end of the right lower link 61 and the bracket 62. A locking plate 67 is welded to the pin 65 adjacent its head and extends radially therefrom and is bolted to the side sheet 30 thereby retaining the pin 65 in place. Thus the front end of the lower links 60 and 61 are pivotally attached to the rear end of the header, the pivot axes, i.e., the pins 65, of the lower links being coaxial. The rearward ends of the left and right lower links 60 and 61 are pivotally connected as by pivot pins 69 respectively to the lower ends of the vertical frame members 14 and 15, the axes of the pivot pins 69 also being coaxial.

Lifting and floatation means are provided for raising and lowering the header 12 relative to the carrying frame and for counterbalancing a large portion of the weight of the header 12 to allow it to follow the ground in a more responsive fashion. To this end, a lifting strap 80 is pivotally connected as by pin 81 to the lower link 60 midway between its ends and at the bottom of the link 60 below the pivot pin 69, the strap 80 extending upwardly therefrom to a spring anchor 82 attached thereto as by welding and extending laterally outwardly on either side thereof. The lower ends of a pair of floatation tension springs 84 are hooked on the respective spring anchors 82 and extend upwardly inside the frame member 14 to end retaining collars 85 which are threaded on adjusting screws 86 extending through the vertical frame members 14. Thus, by turning the screws 86, a proper amount of tension may be placed on the floatation springs 84. The lifting strap 80 extends beyond the floatation spring anchors 82 to a slotted upper end inside the vertical frame member 14. The slot 87 in the upper end of the lifting strap 80 is engaged by a pin 89 on a lifting lever 90 pivotally connected to the frame member 14 as by transverse pin 91. The lifting lever 90 extends radially outwardly from the pin 91 with a lifting strap 80 to a pivotal connection as by pin 92 with the rod end of a hydraulic cylinder 94 pivotally anchored as at 95 to a gusset within the vertical frame member 14. It will be understood that a similar lift and float mechanism is attached to the right swing link 61 and extends into the right vertical frame member 15. Thus, when the header 12 is in operating position with its ground shoe 40 engaging the ground, the floatation springs 84 acting on the lower swing links 60 and 61 through the short portion of the lifting strap 80 counterbalance the header 12 while the lost motion connections between the slot 87 and the lifting lever 90 prevents the hydraulic cylinders 94 from being pumped during floatation during normal operation. It will be seen that since the connection 81 of the lifting strap is at the bottom of the link 60 and below the pivot 69, the lever arm through which the floatation springs 84 act increases as the header 12 floats upwardly. Thus, although the springs 84 become weaker, the increased lever arm prevents the counterbalancing effect from being reduced accordingly. Extending the hydraulic cylinder 94 takes up the lost motion connection and acting on the lower swing links through the lifting strap 80, raises the header to the transport position, the uppermost position illustrated in FIG. 3.

As thus far described, there is no connection, other than the header 12, between the left and right lower swing links 60 and 61. Thus, it can be seen from the schematic diagram of FIG. 4 (forgetting for the moment the torque transmitting bar 100) that, due to the pivotal connections existing between the lower swing links and the header and carrying frame, lateral floatation is present, that is, the forward end of the link 61 could be raised without raising the forward end of the left link 60. Such is the normal operating condition of the harvester 10. However, for sidehill and grain operations, a lateral floatation lockout device has been added in the form of a torque transmitting bar 100 which extends along the pivot axis formed by the forward pivot pins 65 between the left and right lower swing links 60 and 61. As viewed in FIG. 5, it will be seen that the torque transmitting bar 100 is hollow and has a radially extending plate 101 welded to the end thereof, the plate having an aperture receiving the end of the pivot pin 65 which maintains the end of the torque transmitting tube 100 in alignment with the pivot axis. The plate 101 is attached to the right lower link 61 as by bolt 102 to form a torsionally rigid connection between the bar 100 and the link 61. The torque transmitting bar 100 extends through, but is not bound by, the ground shoe attaching bracket 41 to the left side of the header 12 whereat it is attached to the left lower swing link 60 in the same manner so that it is rotatable relative to the header 12. It can be seen that any tendency for one of the lower swing links 60, 61 to move angularly with respect to the other lower swing link, as would be the case in a lateral floatation suspension, will produce a moment in the torque transmitting bar 100 is transmitted to the other link to move the other swing link in the same direction as the first. If an absolutely stiff torque transmitting bar is utilized, the result will be a vertical floatation suspension system. The machine may be converted to a full lateral floatation suspension mode merely by removing one of the bolts 102 interconnecting the torque transfer bar plate 101 and the lower links 60 or 61.

Thus, it is apparent that there has been disclosed, in accordance with the invention, a roll opening device that fully satisfies the objects, aims, and advantages set forth above. While the invention has been described in conjunction with a specific embodiment thereof, it is evident that many alternatives, modifications, and variations will be apparent to those skilled in the art in light of the foregoing description. Accordingly, it is intended to embrace such alternatives, modifications and variations as fall within the spirit and scope of the appended claims.

What is claimed is:

1. A hay harvesting machine comprising:
   a wheel supported main frame;
   a laterally elongated crop harvesting header mounted to said frame by pivotal linkage including an upper link and a pair of lateraly spaced lower swing links permitting movement of the header between a lower operating position and a raised transport position;
   hay cutting apparatus mounted on said header and disposed transversely thereacross adjacent the forward edge of said header;
   upper and lower transversely extending hay conditioning rolls rotatably mounted to said header rearwardly of said cutting apparatus, said lower conditioning roll being mounted on a fixed axis and said upper roll being mounted at each end to lever arms pivotally mounted to said header for relative swinging movement of the upper roll toward and away from said lower roll;
   spring tensioning means connected to said lever arms and biasing said upper roll to an operating position closely adjacent the lower roll;
   toggle links pivotally mounted to said header adjacent each of said roll lever arms and being operatively connected thereto and having a free ends projecting toward said frame, said frame including means engaging said toggle links for causing a downward force to be exerted on said free ends of said toggle links upon said header being raised to said transport position so that said upper conditioning roll is opened against the force of said tensioning spring.

2. The invention in accordance with claim 1 and said means for causing a downward force on said toggle link comprising a tensile member connected to said free end of said toggle link and to said frame.

3. The invention in accordance with claim 2 and said tensile member comprising a chain.

4. The invention in accordance with claim 1 and said main frame comprising a main horizontal beam extending laterally above said crop harvesting header and a pair of vertical frame members disposed adjacent the ends of said header rearwardly of said cutting apparatus, and tensile members interconnecting the free end of said toggle link and the medial portion of said vertical frame members.

* * * * *